June 30, 1942.  A. WARMISHAM  2,288,502
OPTICAL OBJECTIVE
Filed Dec. 6, 1940

Fig. 1.

| | $R_1$ | $R_2$ | $R_3$ | $R_4$ | $R_5$ | $R_6$ | $R_7$ | $R_8$ |
|---|---|---|---|---|---|---|---|---|
| | +·3341 | −2·748 | −·5887 | +·7633 | −1·662 | +·3816 | +1·198 | −·4335 |

| $D_1$ | $S_1$ | $D_2$ | $S_2$ | $D_3$ | $S_3$ | $D_4$ |
|---|---|---|---|---|---|---|
| ·068 | ·0515 | ·0134 | ·0196 | ·0134 | ·0618 | ·0587 |

Fig. 2.

| | $R_1$ | $R_2$ | $R_3$ | $R_4$ | $R_5$ | $R_6$ | $R_7$ | $R_8$ |
|---|---|---|---|---|---|---|---|---|
| | +·3141 | −3·298 | −·6596 | +·7889 | ∞ | +·3585 | +1·192 | −·4547 |

| $D_1$ | $S_1$ | $D_2$ | $S_2$ | $D_3$ | $S_3$ | $D_4$ |
|---|---|---|---|---|---|---|
| ·0653 | ·0495 | ·0129 | ·0139 | ·0129 | ·0594 | ·0564 |

INVENTOR
A WARMISHAM
BY Blair Kilcoyne
ATTORNEYS

Patented June 30, 1942

2,288,502

UNITED STATES PATENT OFFICE 2,288,502

OPTICAL OBJECTIVE

Arthur Warmisham, Leicester, England, assignor to Taylor, Taylor & Hobson Limited, Leicester, England, a company of Great Britain Application December 6, 1940, Serial No. 368,918
In Great Britain December 8, 1939

6 Claims. (Cl. 88—57)

This invention relates to an optical objective for photographic or like purposes comprising four asymmetrically arranged components separated by air spaces and each consisting of a simple element, the two outer components being convergent and the two inner divergent. For the most part such objectives have been corrected only for apertures less than F/4 or F/4.5, but in one known arrangement a higher aperture, F/3.5, has been obtained by the use of an abnormally long middle air space between the two divergent components and short outer air spaces respectively separating such components from the two convergent components.

The present invention has for its object to provide an improved objective of this kind corrected for an aperture of not less than F/3.5, and having a wide angular field.

In the objective according to the present invention the middle air space is less than either of the outer air spaces and less than one-third of the sum of such air spaces, neither of which exceeds .09 of the equivalent focal length of the objective.

The numerical sum of the radii of curvature of the front surface of the front convergent component and the rear surface of the rear convergent component is preferably greater than .70 of the equivalent focal length of the objective. Preferably also the numerical sum of the radii of curvature of the front surface of the front divergent component and the rear surface of the rear divergent component is greater than .80 of the equivalent focal length of the objective. It is to be understood that the terms "front" and "rear" as used herein relates respectively to the sides of the objective nearer to and further from the longer conjugate in accordance with the usual convention.

Figures 1 and 2 of the accompanying drawing respectively show two convenient examples of objective according to the invention, and numerical data for these examples are given in the following tables, in which $R_1 R_2 \ldots$ indicate the radii of curvature of the individual lens surfaces counting from the front (the positive sign relating to surfaces convex towards the front and the negative sign to surfaces concave thereto) $D_1 D_2 \ldots$, indicate the axial thicknesses of the individual lens elements, and $S_1 S_2 S_3$ indicate the axial air separations between the components. The tables also give the mean refractive indices and the Abbé V numbers of the glasses used for the lens elements.

Example I

Equivalent focal length 1.000. Relative aperture F/3.5.

| Radius | Thickness or separation | Refractive index $n_D$ | Abbé V number |
|---|---|---|---|
| $R_1 = +.3341$ | $D_1 = .0680$ | 1.613 | 59.4 |
| $R_2 = -2.748$ | $S_1 = .0515$ | | |
| $R_3 = -.5887$ | $D_2 = .0134$ | 1.579 | 40.4 |
| $R_4 = +.7633$ | $S_2 = .0196$ | | |
| $R_5 = -16.62$ | $D_3 = .0134$ | 1.579 | 40.4 |
| $R_6 = +.3816$ | $S_3 = .0618$ | | |
| $R_7 = +1.198$ | $D_4 = .0587$ | 1.613 | 59.4 |
| $R_8 = -.4335$ | | | |

Example II

Equivalent focal length 1.000. Relative aperture F/3.5.

| Radius | Thickness or separation | Refractive index $n_D$ | Abbé V number |
|---|---|---|---|
| $R_1 = +.3141$ | $D_1 = .0653$ | 1.613 | 59.4 |
| $R_2 = -3.298$ | $S_1 = .0495$ | | |
| $R_3 = -.6596$ | $D_2 = .0129$ | 1.653 | 33.6 |
| $R_4 = +.7889$ | $S_2 = .0139$ | | |
| $R_5 = \infty$ | $D_3 = .0129$ | 1.579 | 40.4 |
| $R_6 = +.3585$ | $S_3 = .0594$ | | |
| $R_7 = +1.192$ | $D_4 = .0564$ | 1.644 | 48.3 |
| $R_8 = -.4547$ | | | |

It will be noticed that in both examples $S_2$ is considerably less than $S_1$ or $S_3$ or a third of the sum of $S_1$ and $S_3$, whilst $S_2$ and $S_3$ are both less than 0.09, the numerical sum of $R_1$ and $R_8$ is greater than 0.70, and the numerical sum of $R_3$ and $R_8$ is greater than 0.80. These examples are both corrected over a semi-angular field of 25°.

What I claim as my invention and desire to secure by Letters Patent is:

1. An optical objective corrected for spherical and chromatic aberrations, astigmatism, coma, distortion and curvature of field and comprising four axially aligned and asymmetrically arranged components separated by air spaces and each consisting of a simple element, the two outer components being convergent and the two inner divergent, wherein the radius of curvature of the front surface of the rear divergent component is at least five times that of the rear surface of such component and the radius of curvature of the front surface of the front divergent component lies between 70% and 90% of that of the rear surface of such component, whilst the middle air space is less than either of the two outer air spaces and less than one third of the sum of such outer air spaces, neither of which exceeds .09 of the equivalent focal length of the objective.

2. An optical objective as claimed in claim 1, in which the numerical sum of the radii of curvature of the front surface of the front convergent component and the rear surface of the rear convergent component is greater than .70 of the equivalent focal length of the objective.

3. An optical objective as claimed in claim 1, in which the numerical sum of the radii of curvature of the front surface of the front divergent component and the rear surface of the rear divergent component is greater than .80 of the equivalent focal length of the objective.

4. An optical objective as claimed in claim 1, in which the numerical sum of the radii of curvature of the front surface of the front convergent component and the rear surface of the rear convergent component is greater than .70 of the equivalent focal length of the objective, whilst the numerical sum of the radii of curvature of the front surface of the front divergent component and the rear surface of the rear divergent component is greater than .80 of the equivalent focal length of the objective.

5. An optical objective for photographic or like purposes having numerical data substantially as set forth in the following table:

Equivalent focal length 1.000. Relative aperture F/3.5.

| Radius | Thickness or separation | Refractive index $n_D$ | Abbé V number |
|---|---|---|---|
| $R_1 = +.3341$ | $D_1 = .0680$ | 1.613 | 59.4 |
| $R_2 = -2.748$ | | | |
| $R_3 = -.5887$ | $S_1 = .0515$ | | |
| $R_4 = +.7633$ | $D_2 = .0134$ | 1.579 | 40.4 |
| $R_5 = -16.62$ | $S_2 = .0196$ | | |
| $R_6 = +.3816$ | $D_3 = .0134$ | 1.579 | 40.4 |
| $R_7 = +1.198$ | $S_3 = .0618$ | | |
| $R_8 = -.4335$ | $D_4 = .0587$ | 1.613 | 59.4 | wherein $R_1 R_2$ . . . represent the radii of curvature of the various surfaces, DD . . . the axial thicknesses of the lens elements and $S_1 S_2 S_3$ the axial air spaces between the elements.

6. An optical objective for photographic or like purposes having numerical data substantially as set forth in the following table:

Equivalent focal length 1.000. Relative aperture F/3.5.

| Radius | Thickness or separation | Refractive index $n_D$ | Abbé V number |
|---|---|---|---|
| $R_1 = +.3141$ | $D_1 = .0653$ | 1.613 | 59.4 |
| $R_2 = -3.298$ | | | |
| $R_3 = -.6596$ | $S_1 = .0495$ | | |
| $R_4 = +.7889$ | $D_2 = .0129$ | 1.653 | 33.6 |
| $R_5 = \infty$ | $S_2 = .0139$ | | |
| $R_6 = +.3585$ | $D_3 = .0129$ | 1.579 | 40.4 |
| $R_7 = +1.192$ | $S_3 = .0594$ | | |
| $R_8 = -.4547$ | $D_4 = .0564$ | 1.644 | 48.3 | wherein $R_1 R_2$ . . . represent the radii of curvature of the various surfaces, DD . . . the axial thicknesses of the lens elements and $S_1 S_2 S_3$ the axial air spaces between the elements.

ARTHUR WARMISHAM.